April 18, 1967  HIROSHI WATANABE ETAL  3,315,157
APPARATUS FOR IMPEDANCE MEASUREMENT THROUGH
THE USE OF ELECTRON BEAM PROBES
Filed Nov. 13, 1963
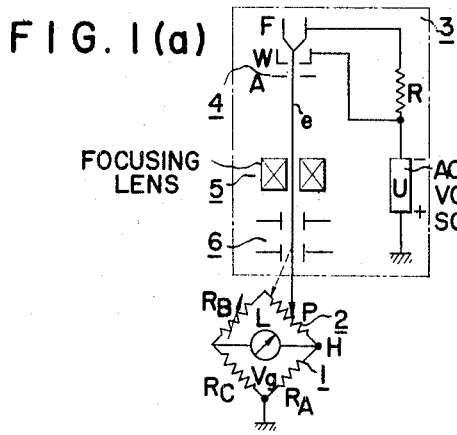
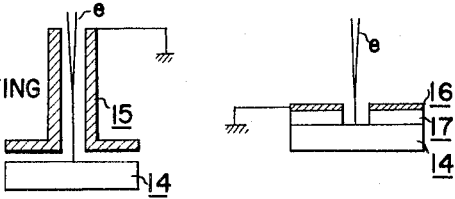
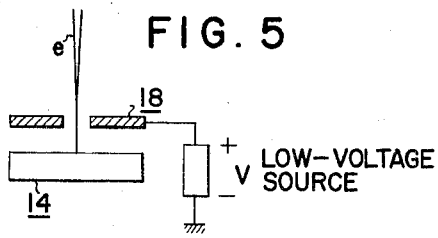
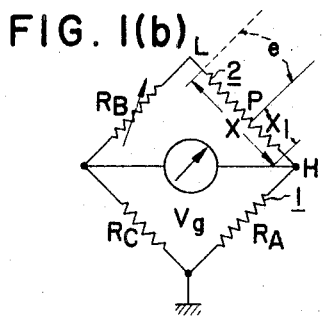
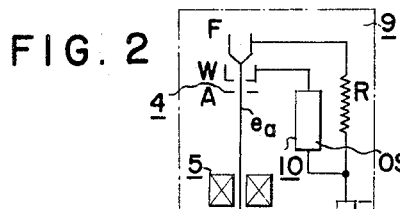
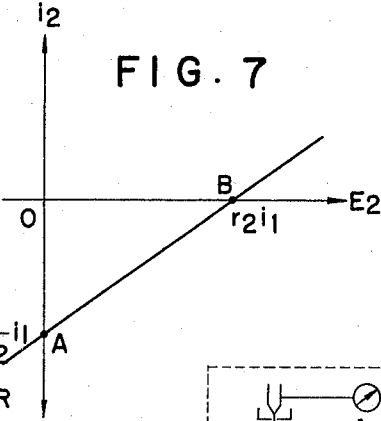
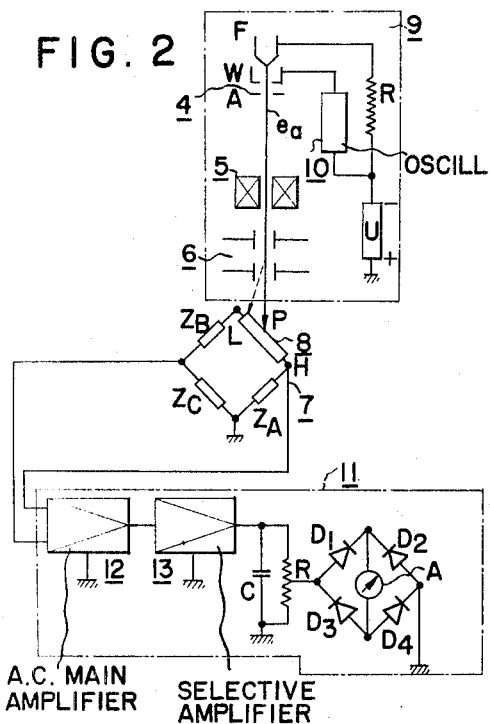
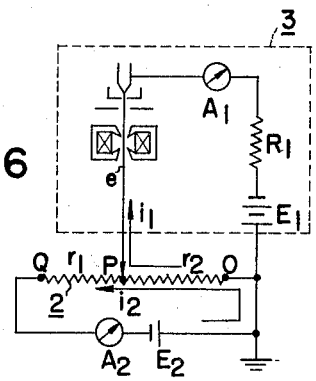
INVENTOR.
Hiroshi Watanabe
Chusuke Munakata
BY
Western & Western

1

3,315,157
APPARATUS FOR IMPEDANCE MEASUREMENT THROUGH THE USE OF ELECTRON BEAM PROBES
Hiroshi Watanabe and Chusuke Munakata, Kitatama-gun, Tokyo-to, Japan, assignors to Kabushiki Kaisha Hitachi Seisakusho, Tokyo-to, Japan, a joint-stock company of Japan
Filed Nov. 13, 1963, Ser. No. 323,489
Claims priority, application Japan, July 22, 1963, 38/37,082
4 Claims. (Cl. 324—62)

This invention relates to techniques in the measurement of impedances, and more particularly it relates to a new apparatus for measurement of impedances through the use of electron beam probes.

Heretofore, for the measurement of resistance between any two points of an ordinary electrical element such as a semi-conductor or a resistor, the general practice has been to resort to devices wherein probes establishing mechanical contact and other mechanical probes or solid probes are used.

However, in order to measure the resistance between two points in an extremely minute part of such an electrical element by these conventional apparatus, it is necessary, of course, to make the contact areas of the probes as small as possible. This necessity has given rise to serious disadvantages of conventional apparatus wherein mechanical probes are used. More explicitly, in these apparatus, it is difficult to make a contact area less than $10\mu\Phi$ irrespective of how sharp the extreme tip of a mechanical probe is made. Moreover, if the tip of a mechanical probe is made too sharp, there will arise the possibility of its mechanically damaging the parts to be measured and changing their electrical properties. Consequently, such apparatus have been accompanied by numerous difficulties in actual practice, and, moreover, with such devices, decreases in measurement precision could not be easily avoided.

It is an object of the present invention, in its broad aspect, to overcome the above-stated difficulties.

More specifically, it is an object to provide an original and new apparatus for measurement of resistance and other impedance values of minute parts of electrical elements with high precision and without damaging the objects being measured.

The foregoing object, as well as other objects and advtantages as will presently become apparent, have been achieved by the present invention, the principal feature of which is the use of an electron beam focused very finely as a probe in place of a mechanical probe.

The nature, principle, and details of the invention will be best understood by reference to the following description of preferred embodiments of the invention, taken in conjunction with the accompanying drawings in which like parts are designated by like reference characters, and in which:

FIG. 1 is a schematic diagram indicating the composition and arrangement of one preferred embodiment of the invention;

FIG. 2 is a similar schematic diagram indicating another embodiment of the invention;

FIGS. 3, 4, and 5 are simplified diagrams showing specific means suitable for suppressing the influence of secondary electrons in the embodiments of the invention shown in FIGS. 1 and 2;

FIG. 6 is a schematic diagram indicating still another embodiment of the invention; and FIG. 7 is a graphical representation indicating one example of $E_2$ versus $i_2$ characteristics in the embodiment of the invention shown in FIG. 6.

2

In one embodiment of the invention as shown in FIG. 1, the resistance object 2 to be measured is connected as one arm of a direct-current bridge circuit 1, and a thinly constricted electron beam $e$ to be used as a probe in the measurement is generated by an electron beam generating system 3. The electron beam generating system 3 comprise; an electron gun 4 made up of a filament F, a Whenelt cylinder W, and an anode A; focusing lens 5; two sets of deflecting plates 6 for deflecting the electron beam $e$, the two sets being respectively oriented vertically and horizontally in mutually perpendicular directions; a bias resisto R for stabilizing the electron beam; and an accelerating voltage source U for the electron gun 4. The bridge circuit 1 has an unbalance voltage detector $V_g$ (a galvanometer in this case) and resistors $R_A$, $R_B$, and $R_C$ in its arms other than the arm occupied by the aforemetioned resistance object 2. The outer ends of the resistance object 2 are connected by way of junctions L and H respectively to resistors $R_B$ and $R_A$, the galvanometer $V_g$ being connected between the junction H and the opposite junction between resistors $R_B$ and $R_C$.

Since the electron beam $e$, upon being projected onto one selected point on the resistance object 2, can be readily caused to have a spot diameter of the order of 1 micron or less, this electron beam functions as a probe with a very small contact area and can be effectively used in the following manner.

First, by projecting the electron beam $e$ on one outer end of the resistance object 2, that is, the junction L, and so adjusting any of the known resistors $R_A$, $R_B$, and $R_C$ of the bridge as to cause the indication of the detector $V_g$ to be zero, the bridge is exactly balanced. Then, the total resistance value X of the resistance object 2 can be expressed by the following known equation $$X = \frac{R_A \cdot R_B}{R_C} \qquad (1)$$

Next, in order to determine the resistance value $X_1$, shown in FIG. 1($b$), between any one point P on the resistance object 2 and the junction H of the bridge, the electron beam $e$ is moved to be projected on the point P, and the bridge is again balanced. The balancing conditions at this time can be expressed by the following equation.

$$\{R_B + (X - X_1)\}R_A = X_1 R_C \qquad (2)$$

consequently, the following expression is obtained.

$$x_1 = \frac{R_B + X}{R_C/R_A + 1} \qquad (3)$$

Thus, by first measurement of the total resistance X as indicated by Equation 1, it is possible to determine from Equation 3 the resistance value between any points on the resistance object 2.

Although the above description relates to the case of resistance measurement by means of a continuous electron beam, it is also possible to measure impedances other than resistances over a wide range by using a pulsating electron beam and a suitable alternating-current bridge. Of course, for measuring only a resistance, measurement merely by a direct-current bridge method, that is, by means of a continuous electron beam, is satisfactory. However, in the case of direct current, there is some possibility of some increase in measurement error because of the influence of thermoelectromotive force originating from the temperature rise of the resistance object 2 generated by the continuous electron bombardment. By the abovementioned alternating-current bridge method, on the other hand, it is possible to remove the effect of the thermoelectromotive force, wherefore this method is substantially advantageous in actual practice.

Such an alternating-current bridge method of measuring impedances may be carried out by means of another embodiment of the invention as shown in FIG. 2. In this arrangement, there is provided an A.C. bridge circuit 7 having as one arm thereof an impedance 8 to be measured and an electron beam generating system 9. In arrangement of this embodiment, the system 9 differs from that shown in FIG. 1 only in the addition of an oscillator 10 in order to cause the electron beam to be pulsating, the oscillator 10 being adapted to modulate the bias voltage of the Whenelt cylinder W. The repeating frequency of the pulsating electron beam $e_a$ so generated in this system 9 is selected to be 1 kilocycle/second.

The unbalance voltage of the bridge circuit 7 is detected by an unbalance voltage detector 11, which may be simply a voice receiver but, in this case is an A.C. amplifier for the purpose of increasing sensitivity. More specifically, unbalance voltage is amplified in an alternating-current main amplifier 12 to a degree of approximately 100 db, and of the output thereof, only the 1 kilocycle/sec. component is further amplified to approximately 30 db by a selective amplifier 13. At the same time, any high-frequency noise which cannot be removed is attenuated by means of a capacitor C, and only the true signal component thus obtained is full-wave rectified in a bridge circuit of diodes $D_1$ through $D_4$ and is indicated by a high-sensitivity ammeter A. Accordingly, the detecting sensitivity of this apparatus is extremely high, and a signal voltage of several m$\mu$v. can be detected.

The measurement of impedance may be carried out in exactly the same manner as in the afore-described case of resistance measurement. That is, if only the measurement principle is considered, the question of whether to use a direct-current electron beam or an alternating-current electron beam in the present invention merely corresponds to that in an ordinary bridge of whether its voltage source is direct current or alternating-current. Accordingly, there is not much difference in the measurement devices.

In either of the above-mentioned resistance measurement and impedance measurement, when the electron beam is projected onto an object to be measured, secondary electrons of a certain quantity are given off from the said object as is well known. Although the composition of these secondary electrons is such that the major portion consists of electrons with low energy, a portion of reflected electrons (energy equal to or almost equal to that of the abovesaid electron beam) is also included. Then, at the time of measurement, these secondary electrons are emitted from the beam irradiated point and enter parts other than the object to be measured, whereby errors are sometimes introduced into the measurement. Accordingly, in order to eliminate thoroughly such measurement error, it is preferable to resort to a measure such as preventing movement of the said secondary electrons, absorbing the secondary electrons, or driving back the secondary electrons.

For example, as shown in FIG. 3, the electron beam $e$ in the region of its irradiated point is encompassed by a shield plate 15 made of a suitable conductor and adapted to cover the entire upper part of an object 14 to be measured. By this arrangement, secondary electrons emitted from the object 14, for the most part, reach the shield plate 15 and escape to the ground (earth), whereby it is possible to reduce the effect of the secondary electrons. In the example expedient shown in FIG. 4, the parts of the object 14 to be measured other than the beam irradiated point are directly and completely covered with an insulator 17 to which is bonded a metal conductor 16. Therefore, secondary electrons cannot enter the said other parts of the object 14, and the same effect as that in the example shown in FIG. 3 can be attained. In the case when the object 14 is of miniature size, and in the case when it is of an unusual shape, it may be difficult to resort to any of the above-described measures. In such a case, a shield plate 18 is disposed at a position somewhat separated from the object 14, as shown in FIG. 5, and a positive (or negative) voltage V (for example, from 20 to 30 volts) which is extremely low relative to the accelerating voltage is applied on the shield plate 18 so as to absorb (or drive back) the secondary electrons.

While in the foregoing disclosure, the procedure for measuring resistance or impedance by a bridge method has been described, it is possible to accomplish resistance measurement through the use of an electron beam probe also by a device which comprises means for irradiating with an electron beam, for example, one predetermined point on a specimen to be measured, means for measuring the relationship between the voltage-current characteristics, means for and impinging an electron beam current between any other two points on the said specimen, and means for determining from this relationship the resistance value between the said irradiated point and either of the said other two points. This resistance measurement apparatus will now be described with respect to an embodiment of the invention.

Referring to FIG. 6, a thinly constricted electron beam $e$ is generated in an electron beam generating system 3, which includes means for supplying an accelerating voltage $E_1$ and an equivalent internal resistance $R_1$, with a beam current $i_1$. A variable voltage $E_2$ is applied across the two ends O and Q of a resistance object 2 to be measured, and an ammeter $A_2$ for reading the resulting current $i_2$ flowing therethrough is inserted in the circuit as shown.

By projecting the electron beam $e$ in a thinly focused state on one point P of the resistance object 2, the spot diameter of the electron beam $e$ can be readily made to be of the order of $1\mu\Phi$ or less whereby the electron beam functions as a probe with a very small contact area. At this point P, the resistance object 2 may be considered to be divided into two parts PQ and OP having, respectively, resistance values $r_1$ and $r_2$. By so selecting the various constants that the relationships $E_1 \gg E_2$ and $R_1 \gg (r_1+r_2)$ are valid (which condition, obviously, can be readily established in the case of an ordinary high-speed electron beam generating system), the following relationships are made valid.

$$(i_1+i_2)r_2+i_2r_1=E_2 \qquad (4)$$

$$i_1 \cong E_1/R_1 \qquad (5)$$

By taking the beam current $i_1$ as a known parameter and graphically representing the relationship expressed by Equation 4, an $i_2$ versus $E_2$ curve as shown in FIG. 7 can be obtained. Variation of the beam current $i_1$ causes the curve to shift parallel. The point A at which the curve intersects the vertical axis corresponds to $$i_{2(E_2=0)} = \frac{-r_2}{r_1+r_2}i_1$$

The point B at which the curve intersects the horizontal axis corresponds to $$E_{2(i=0)} = r_2 i_1$$

Then, by taking $i_1$ as a parameter in the case of the circuit arrangement indicated in FIG. 6 and determining the $i_2$ versus $E_2$ relationship as indicated in FIG. 7, the values of $r_1$ and $r_2$ can be readily determined from this relationship. For example, by determining $$E_{2(i_2=0)}$$

at the point B with respect to a certain constant beam current $i_1$ $$r_2 = E_{2(i_2=0)}/i_1$$

By similarly determining $$i_{2(E_2=0)}$$

at the point A $$r_1 = r_2\left(\frac{i_1}{i_{2(E_2=0)}} - 1\right) = \frac{E_{2(i_2=0)}}{i_1}\left(\frac{i_1}{i_{2(E_2=0)}}\right).$$

Accordingly, by the above-described procedure and by moving the point P of projection of the electron beam $e$ to any point, the values of $r_1$ and $r_2$ can be determined in a simple manner.

As will be observed from the foregoing disclosure, the present invention provides an apparatus wherein an electron beam is used as a probe having an extremely small contact area, whereby resistance measurements of minute parts of objects and, in addition, impedance measurements can be made with high precision without damaging the parts to be measured. Moreover, since by the practice of this invention, the electron beam can be moved accurately by any desired quantity by adjusting the strength of the electric field between the deflecting plates 6 in FIG. 2 and since it is not influenced by the mechanical state of the surface even at the contact point, not only is it possible to obtain good reproducibility in repeated measurements, but the measuring operations also are remarkably easy to carry out.

It should be understood, of course, that the foregoing disclosure relates to only preferred embodiments of the invention and that it is intended to cover all changes and modifications of the examples of the invention herein chosen for the purposes of the disclosure, which do not constitute departures from the spirit and scope of the invention as set forth in the appended claims.

What is claimed is:

1. An apparatus for measuring electrical impedances by means
of an electron beam probe, comprising a bridge circuit including four impedance arms; means for emitting a thinly constricted electron beam; means for periodically varying the intensity of said electron beam; means for causing said electron beam to impinge on predetermined points of a specimen which constitutes one arm of said bridge circuit; a variable impedance for balancing the bridge which constitutes another arm of said bridge; and means for detecting the balance of said bridge circuit, whereby the impedance value between said predetermined points of the specimen is determined.

2. The apparatus as defined in claim 1, wherein there is further provided means for suppressing the emission of secondary electrons from the point on said specimen irradiated by said electron beam.

3. An apparatus for measuring electrical resistance by means
of an electron beam probe, comprising means for emitting a thinly constricted electron beam whose intensity is constant for supplying a current to a specimen; means for causing said electron beam to impinge on predetermined points of a specimen; a variable D.C. voltage connected across said specimen; another D.C. voltage connected between one end of said emitting means and one end of said specimen; means for measuring current flowing in said specimen; and means for measuring said electron beam current, whereby the resistance value between said predetermined points of the specimen is determined by computing the measured values.

4. The apparatus as defined in claim 3, wherein there is further provided means for suppressing the emission of secondary electrons from the point on said specimen irradiated by said electron beam.

References Cited by the Examiner

UNITED STATES PATENTS

| | | | |
|---|---|---|---|
| 1,229,740 | 6/1917 | Furstenan | 324—62 |
| 2,868,988 | 1/1959 | Miller | 250—49.5 |
| 3,035,176 | 5/1962 | Kis et al. | 324—57 |
| 3,054,896 | 9/1962 | Jones et al. | 250—49.5 |
| 3,063,010 | 11/1962 | Richardson | 324—62 |

WALTER L. CARLSON, *Primary Examiner.*

E. E. KUBASIEWICZ, W. H. BUCKLER,
*Assistant Examiners*